(12) United States Patent
Pahud et al.

(10) Patent No.: US 8,938,558 B2
(45) Date of Patent: Jan. 20, 2015

(54) MODIFYING FUNCTIONALITY BASED ON DISTANCES BETWEEN DEVICES

(71) Applicant: Microsoft Corporation, Redmond, WA (US)

(72) Inventors: Michel Pahud, Kirkland, WA (US); Kenneth P. Hinckley, Redmond, WA (US); William A. S. Buxton, Toronto (CA); Gina D. Venolia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/830,375

(22) Filed: Mar. 14, 2013

(65) Prior Publication Data
US 2014/0250245 A1    Sep. 4, 2014

Related U.S. Application Data

(60) Provisional application No. 61/772,390, filed on Mar. 4, 2013.

(51) Int. Cl.
*G06F 3/00* (2006.01)
*G06F 13/12* (2006.01)
*G06F 13/10* (2006.01)
*G06F 13/38* (2006.01)
*G06F 9/44* (2006.01)

(52) U.S. Cl.
CPC ............... *G06F 13/102* (2013.01); *G06F 3/00* (2013.01); *G06F 13/385* (2013.01); *G06F 9/4411* (2013.01)

USPC ................... 710/14; 710/15; 710/62

(58) Field of Classification Search
CPC ........ G06F 13/385; G06F 3/00; G06F 9/4411
See application file for complete search history.

(56) References Cited

U.S. PATENT DOCUMENTS

| | | | |
|---|---|---|---|
| 7,015,932 B1 | 3/2006 | Koike et al. | |
| 8,257,177 B1 | 9/2012 | Saund et al. | |
| 8,312,392 B2 | 11/2012 | Forutanpour et al. | |
| 2007/0293190 A1 | 12/2007 | Ota | |
| 2008/0300055 A1* | 12/2008 | Lutnick et al. | 463/39 |
| 2011/0151926 A1 | 6/2011 | Kim et al. | |

OTHER PUBLICATIONS

Ballendat, et al., "Proxemic Interaction: Designing for a Proximity and Orientation-Aware Environment", Published on: Nov. 7, 2010, 10 pgs, Available at: http://citeseerx.ist.psu.edu/viewdoc/download-?doi=10.1.1.174.8451&rep=rep1&type=pdf.

(Continued)

*Primary Examiner* — Zachary K Huson
(74) *Attorney, Agent, or Firm* — Stephen A. Wight; Judy Yee; Micky Minhas (57) ABSTRACT

Described herein are techniques and systems that allow modification of functionalities based on distances between a shared device (e.g., a shared display, etc.) and an individual device (e.g., a mobile computing device, etc.). The shared device and the individual device may establish a communication to enable exchange of data. In some embodiments, the shared device or the individual device may measure a distance between the shared device and the individual device. Based on the distance, the individual device may operate in a different mode. In some instances, the shared device may then instruct the individual device to modify a functionality corresponding to the mode.

20 Claims, 7 Drawing Sheets

(56) References Cited

OTHER PUBLICATIONS

Baudisch, et al., "Drag-And-Pop and Drag-And-Pick: Techniques for Accessing Remote Screen Content on Touch- and Pen-Operated Systems", Published on: Sep. 1, 2003, 8 pgs. Available at: http://research.microsoft.com/en-us/um/people/cutrell/DragAndPop_Interact2003.pdf?0sr=a.

Marquardt, et al., "Gradual Engagement between Digital Devices as a Function of Proximity: From Awareness to Progressive Reveal to Information Transfer", Published on: Apr. 20, 2012, 10 pgs, Available at: http://dspace1.acs.ucalgary.ca/bitstream/1880/48937/1/2012-1025-08.pdf.

Nancel, et al., "High-Precision Pointing on Large Wall Displays using Small Handheld Devices", Published on: Feb. 1, 2013, 10 pgs, Available at: http://hal.archives-ouvertes.fr/docs/00/78/65/32/PDF/head-pad-hal-v1.pdf.

PCT Search Report & Written Opinion for Application No. PCT/US2014/020044, mailed on May 9, 2014, 9 pages.

* cited by examiner

MODIFYING FUNCTIONALITY BASED ON DISTANCES BETWEEN DEVICES

CROSS REFERENCE TO RELATED PATENT APPLICATIONS

This patent application claims priority filing benefit from U.S. Provisional Patent Application No. 61/772,390, filed Mar. 4, 2013, which application is hereby incorporated by reference herein, in its entirety.

BACKGROUND

Computing devices are ubiquitous in today's society. Many people own computing devices that can be loaded with applications or software to perform very specific operations. These devices, when loaded with proper software, may be used to control devices, such as televisions, lights, door locks, and other types of devices. Often, when computing devices are used to perform functions of existing devices (e.g., remote controls, etc.), the software designers create software for the computing devices with the same or very similar functionality as the traditional devices. Although this may allow a user to perform desired operations with the computing device, this type of design may fail to leverage performance opportunities that are available with use of the computing device, such as use of global positioning information, network access, and/or other functionality or hardware included in the computing device.

SUMMARY

Described herein are methods and systems that allow modification of functionalities based on distances between a shared device (e.g., a shared display, etc.) and an individual device (e.g., a mobile computing device, etc.) and/or on relative orientations between the shared device and a user operating the individual device.

In some embodiments, the shared device may be in communication with the individual device. The shared device may then measure a distance between the shared device and the individual device. The shared device may translate the distance into a mode of operation. The shared device may then transmit this mode of operation and/or the measured distance to the individual device. The individual device, after receiving the mode of operation (or possibly the measured distance), may then modify a functionality of the individual device, such as by providing display of a user interface that corresponds to the mode of operation or the measured distance received from the shared device. In some embodiments, the individual device may measure the distance between the shared device and the individual device.

In various embodiments, the shared device may track distances associated with multiple individual devices. The shared device may identify one of the individual devices and provide information, such as distance information and/or mode of operation information to that respective individual device while providing different distance information and/or mode of operation information to another one of the individual devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

This disclosure is directed, in part, to systems and techniques to modify a functionality of an individual device (e.g., a mobile computing device, etc.) based on a distance between the individual device and a share device (e.g., a shared display, etc.). For example, a user interface implemented by the mobile computing device may be automatically determined and/or modified based on distances between the mobile computing device and the shared display.

In various embodiments, the shared device may connect with the individual device by performing a connection protocol, such as a handshake or pairing of information. After connecting, the shared device may measure a distance between the shared device and the individual device. Based on the distance, the shared device may determine a mode of operation to be implemented by the individual device. In some embodiments, the shared device may determine the mode of operation based on an orientation of a user operating the individual device in relation to the shared device and/or an absolute orientation associated with the user. The shared device may then instruct the individual device to perform a function and/or modify a functionality based on the mode of operation. For example, the shared device may transmit the mode of operation to the individual device. The individual device may determine the function based on the mode of operation and then perform the function. In some instances, the shared device may detect a change of the distance in response to movement of the user. The shared device may update the mode corresponding to the changed distance, and instruct the individual device to modify the functionality corresponding to the updated mode. In some embodiments, the shared device may transmit the distance information to the individual device. The individual device may then change a mode of operation based on the distance information (e.g., provide a different user interfaces based on different distance ranges, etc.).

In some embodiments, the individual device may measure a distance between the shared device and the individual device, and/or update distance information. For example, the individual device may detect a display associated with the shared device, and measure a distance between the display and the individual device. Based on the distance, the individual device may determine and/or updated a mode of operation associated with a user interface and perform a function corresponding to the mode of operation.

In various embodiments, the shared device may track distances associated with multiple individual devices. The shared device may identify one of the individual devices and provide information, such as distance information and/or mode of operation information to that respective individual device while providing different distance information and/or mode of operation information to another one of the individual devices.

Illustrated Environment

Figure 1:
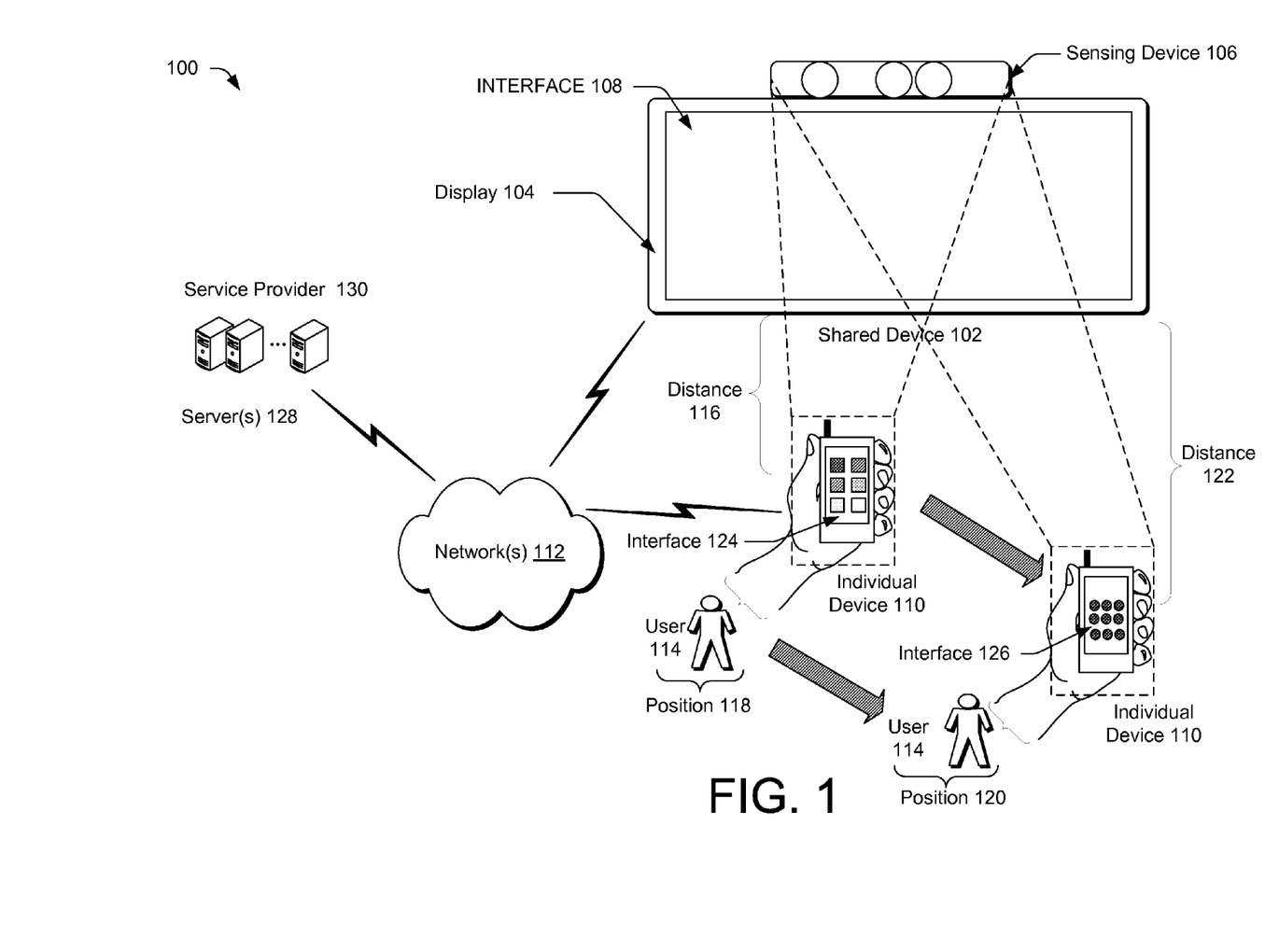
FIG. 1 illustrates an example computing environment for modifying a functionality based on distances between a shared device and an individual device.

FIG. 1 illustrates an example computing environment 100 for modifying a functionality based on distances between a shared device and an individual device. The environment 100 may include a shared device 102 configured with a display 104. The shared device 102 may be a general purpose computer, one or more servers, a set-top box, a game console, or any other computing device capable of exchanging data with another device (e.g., a mobile telephone) and producing outputs (e.g., a visual representation). In some embodiments, the display 104 may be integrated with the shared device 102 while in other embodiments the shared device 102 may be connected to the display 104, but separate devices. For purposes of this discussion, the shared device 102 is discussed as being integrated with the display 104. The shared device 102 may be in communication with a sensing device 106. For example, the shared device 102 may receive inputs from the sensing device 106, and produce a visual representation, which is surfaced in an interface 108 and shown on the display 104. In some embodiments, the shared device 102 and the sensing device 106 may be integrated together.

The share device 102 may be in communication with an individual device 110. The individual device 110 may be a mobile computer, a mobile telephone (e.g., smart phone), a personal computer, a laptop computer, a portable digital assistant (PDA), a game console, a personal media player (PMP), a digital still camera, a digital video camera, a personal navigation device, or any other computing device capable of exchanging data with another device (e.g., a sensing device) and producing outputs (e.g., a visual representation), which can be used with various devices (e.g., a display). In some embodiments, the shared device 102 may be in communication with multiple individual devices. For example, the shared device 102 may receives information from the multiple individual devices, and produce one or more visual representations, which are surfaced in the interface 108 and shown on the display 104.

The shared device 102 may established a connection with the individual device 110 through a communication process, such as a handshake, pairing, exchange of credentials, and/or by using any other processes. In some instances, the shared device 102 may establish the connection when the individual device 110 is in proximity of the shared device 102, the display 104, and/or the sensing device 106. In some embodiments, the connection may be initialized by the shared device 102 or the individual device 110. In some embodiments, the connection may be established via one or more networks 112. The networks 112 may include any one or combination of multiple different types of networks, such as cable networks, the Internet, and wireless networks (e.g., Bluetooth®, Wi-Fi, mobile telephone networks, etc.). For example, the individual device 110 may communicate with the shared device 102 using a hardware address of the shared device 102 that was exchanged during the communication process.

In various embodiments, the shared device 102 may detect a user 114 operating the individual device 110 and track movement of the user 114 within a certain range using the sensing device 106. The shared device 102 may also measure a distance 116 between the user 114 and the shared device 102 using the sensing device 106. Based on the distance 116, the shared device 102 may determine a mode associated with the individual device 110. For example, the shared device 102 may determined the mode by using a predetermined relationship between multiple modes and distances, which may be grouped and/sorted into a table accessible by the shared device 102. The shared device 102 may transmit information associated with the mode to instruct the individual device 110 to perform a function corresponding to the mode.

In some embodiments, the shared device 102 may determine the mode associated with the individual device 110 based on a physical distance (e.g., a linear distance between the sensing device 106 and the individual device 110) and/or a social distance (e.g., an orientation of the user 114 in relation to the sensing device 106). For example, when detecting that the user 114 stands at a position 118 and faces to the sensing device 106 and/or display 104, the shared device 102 may instruct the individual device 110 to perform a function. However, the shared device 102 may instruct the individual device 110 to perform another function when detecting the user 114 stands at the position 118 but faces away from the sensing device 106 and/or display 104.

The shared device 102 may detect movement of the user 114. For example, the user 114 may move from the position 118 to a position 120, as indicated by gray arrows in FIG. 1. The shared device 102 may measure a distance 122 in response to the movement of the user 114. The shared device 102 may then determine the mode associated with the individual device 110 based on the distance 122. If the distance 122 corresponding to a different mode, the shared device may update the mode, and instruct the individual device 110 to modify the current functionality associated with the individual device 110, such as performing a function corresponding to the updated mode.

For example, the distance 116 may be less than a reachable distance by the user 114. In other words, the user 114 may directly interact with the display 104 (e.g., a touch screen). Suppose that a menu mode corresponds to the distance 116. As a result, the shared device 102 may show a whiteboard on the display 104, and instruct the individual device 110 to perform a first menu function. For example, the individual device may present a color palette in a user interface 124 such that the user 114 may paint on the display 104 while controlling colors via the individual device 110.

In some embodiments, the movement of the user 114 may include a change in orientation of the user 114 in relation to the sensing device 106 and/or display 104. The shared device 102 may then determine the mode associated with the individual device 110 based on a change in distance and/or orientation. For example, if the changed distance and/or orientation corresponds to a different mode, the shared device may update the mode, and instruct the individual device 110 to modify the current functionality associated with the individual device 110.

In addition, when the shared device 102 detects that the user 114 moves from the position 118 to the position 120, the shared device 102 may transmit a command to modify a functionality of the individual device 110. In some embodiments, the shared device may measure the distance 122 and determine that the distance 122 is greater than the reachable distance. In other words, the user 114 is further away from the display 104 at the position 120 than at the position 118.

Suppose that a second menu function, such as a remote control function, corresponds to the distance 122. As a result, the shared device 102 may instruct the individual device 110 to perform a remote control function. For example, the individual device 110 may function as a remote input device (e.g., a virtual pointing device and virtual keyboard) such that the user 114 may remotely control the display 104 via the individual device 110 while at the distance 122 from the display 104.

In various embodiments, the shared device 102 may provide distance information to the individual device 110. The individual device 110 may then determine the mode of operation based on the received distance operation.

In some embodiments, the individual device 110 may measure the distance 116, and determine a mode based on the distance 116. Accordingly, the individual device 110 may perform a function corresponding to the mode. For example, based on the predetermined relationship between multiple modes and distances, the individual device 110 may determine a mode associated with a user interface corresponding to the distance 116, and then perform a function corresponding to the mode.

In some embodiments, the mode associated with the individual device 110 may be determined based on the distance and context. The context may be a task that the user 114, the shared device 102, and/or the individual device 110 are performing. Accordingly, while the user 114 is within a same distance from the display 104, the individual device 110 may perform different functions in response to different tasks that the shared device 102 operates, and thus based on the context of operation of the shared device 102. For example, the individual device 110 may function as a color palette when the user 114 is painting on the display 104 using a painting application (one example context), while as a virtual keyboard when the user 114 is making a presentation on the display 104 using presentation software (another example context). In these instances, the distances between the user 114 and the shared device 102 are the same, yet the context of operation of the shared device 102 is different. In some embodiments, the context may include orientation information associated with the individual devices 110 and/or the shared device 102. For example, content may be viewed in a portrait or landscape orientation via the individual devices 110 and/or the shared device 102.

In some embodiments, the shared device 102 may track multiple users operating multiple individual devices via the sensing device 106. In some instances, the shared device 102 may track the multiple users by identifying features of individual users and associating the individual users with one or more individual devices that the individual users are operating. For example, the shared device 102 may identify an individual user based on user characteristics (e.g., voice, facial features and/or body features, etc.) and/or based on other tracking information associated with the individual user (e.g., device identifiers, marker identifiers, self registration, etc.). For further example, using the sensing device 106, the shared device 102 may track multiple users, and measure distances between the individual user and the display 104. Accordingly, based on the distances, the shared device 102 may determine one or more modes, and instruct the multiple individual devices to perform respective functions corresponding to individual mode.

In some embodiments, the shared device 102 may measure distances between multiple users and the display 104. Based on the distances, the shared device 102 may assign to the multiple users different modes, authorities and/or permissions associated with a task that the multiple users are involved. For example, the shared device 104 may assign higher authorities to certain users that are within a certain distance from the display 104. In these instances, these certain users may have permits to modify a document while other users may only have permits to access the document. In some instances, the multiple individual devices may be in communication with each other. Using this communication, multiple users associated with the multiple individual devices may collaborate with a task that the shared device 102 and/or the multiple individual devices are operating. For example, the individual device 110 (e.g., a mobile phone) may in communication with another individual device (e.g., a stylus) to allow multiple users to collaborate side-by-side with their own palette while a whiteboard is shown on the display 104 (e.g., a Perceptive Pixel display), while a globally unique identifier (GUID) is assigned to the stylus.

In some embodiments, the environment 100 may also include server(s) 128 associated with a service provider 130 that provides services (e.g., cloud storage, external content, etc.) to the shared device 102 and/or the individual device 110. In some instances, while interacting with the shared device 102, the individual device 110 may access the services of the service provide 130 via the networks 112. For example, the user 114 may request a mapping service from the service provider 130. The shared device 102 may receive mapping information (e.g., a map) and present the map information on the display 104. Some mapping information may also be provided to the individual device 110, although this mapping information may be different than the mapping information provided to the shared device 102.

In addition, the shared device 102 may present a requested visual representation (e.g., an image, text, etc.) on the display 104 using display parameters that indicate information on how to display the visual presentation. Example display parameters may be a font of text that is displayed or a size of an image displayed by the shared device 102. In these instances, the display parameters may change (e.g., increasing or decreasing font size, image size, etc.) in response to a change of the distance between the user 114 and the display 104. For example, the individual device 110 may decrease a font size of text or a size of an image when detecting that the user 114 moves towards to the display 104. On the other hand, the individual device 110 may increase a font size or a size of the image when detecting that the user 114 moves away from the display 104.

In another example, using another context of operation, the distance of between the user 114 (or the individual device 110) and the shared device 102 may be used to control a zooming of the imagery displayed by the shared device 102. For example, as the user 114 moves toward the shared device 102, the imagery on the interface 108 may show a more detailed view, but less information, such as to facilitate zooming in on a location on a map. Conversely, detected movement of the user moving away from the shared device may cause the shared device to display a zoomed out display that includes additional imagery, but at a smaller scale. Thus, the distance information and/or mode of operation may be used by the shared device to update the interaction with the interface 108, possibly based on the context of the operation of the shared device 102.

Illustrative Architecture

Figure 2:
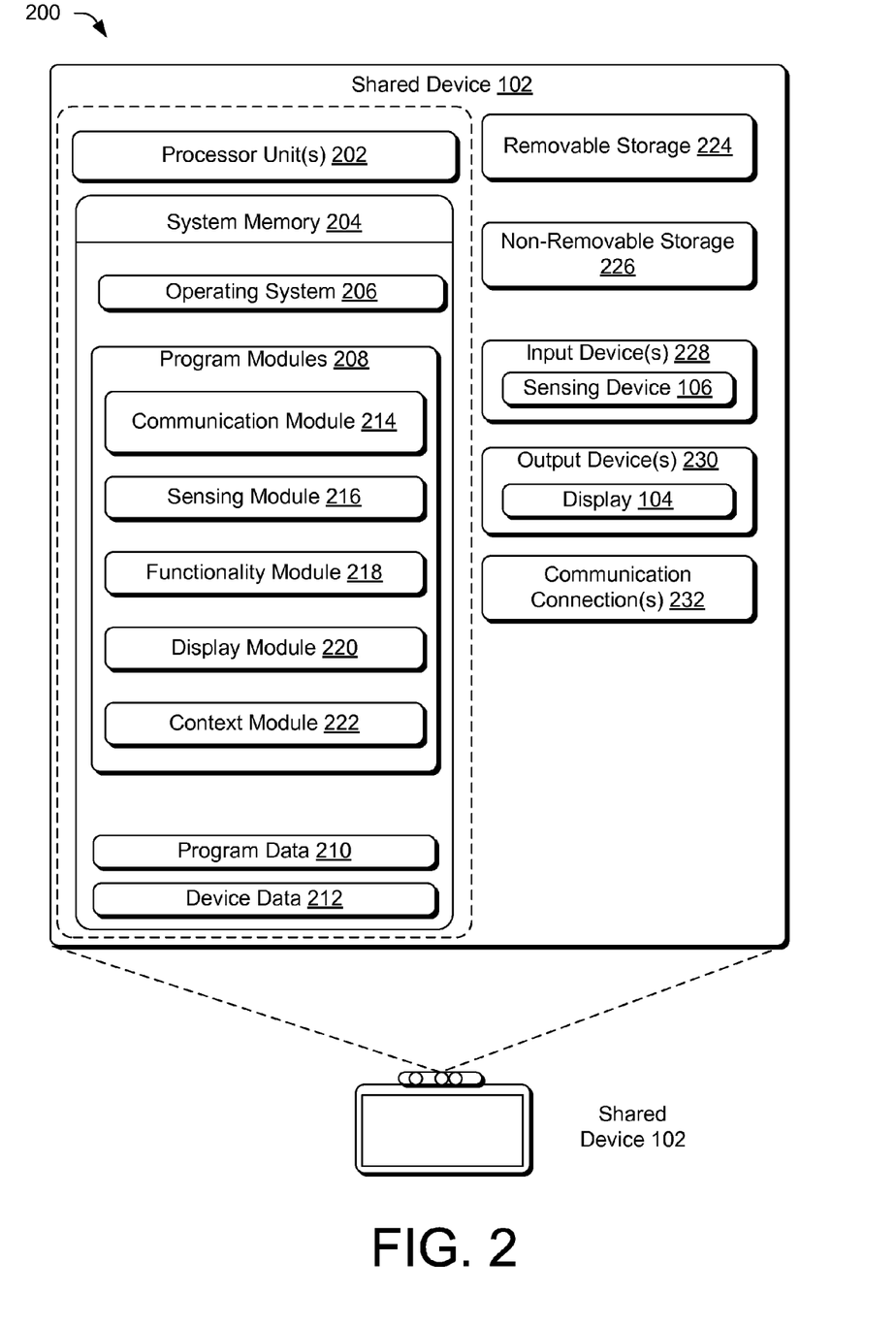
FIG. 2 illustrates an example architecture of the shared device shown in FIG. 1.

FIG. 2 illustrates an example architecture 200 of the shared device 102 shown in FIG. 1. The shared device 102 shown in FIG. 2 and the individual device 110 are only examples of a computing device and are not intended to suggest any limitation as to the scope of use or functionality of the computing device and network architectures. The shared device 102 and the individual device 110 are not intended to be interpreted as having any dependency or requirement relating to any one or combination of components illustrated in the example computing device.

Alternatively, or in addition, the functionally described herein regarding the shared device 102 and the individual device 110 may be performed, at least in part, by one or more hardware logic components. For example, and without limitation, illustrative types of hardware logic components that may be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

In some embodiments, the shared device 102 may include at least one processing unit 202 and system memory 204. Depending on the exact configuration and type of computing device, the system memory 204 may be volatile (such as RAM), non-volatile (such as ROM, flash memory, etc.) or some combination of the two.

The system memory 204 may include an operating system 206, one or more program modules 208, and may include program data 210 as well as device data 212. In some instances, the device data 212 may store information associated with devices (e.g., the individual device 110) that have connected and/or are to be connected with the shared device 102. The program modules 208 may include a communication module 214, a sensing module 216, a functionality module 218, a display module 220, and/or a context module 222, each discussed in turn.

The communication module 214 may be configured to communicate with devices such as the individual device 110 and/or the servers 128. In some embodiments, the communication module 214 may connect with the individual device 110 by performing a connection protocol, such as a handshake, pairing of information, exchange of credentials, and/or by using other connection protocols. For example, the shared device 102 and the individual device 110 may be Bluetooth® capable devices. Accordingly, a personal area network (PANs) may be created between the shared device 102 and the individual device 110.

The sensing module 216 may be configured to detect the user 114 and measure a distance between the display 104 and the user 114 (e.g., the distance 116) or a distance between the display 104 and the individual device 110. For example, combining with the sensing device 106, the sensing module 216 may perform partial or full-body three dimension motion capture, facial recognition, and/or voice recognition. In some embodiments, the sensing module 216 may track movement of the user 114 and/or the individual device 110, and update the distance information (e.g., the distance 116 or 122).

Based on the distance information, the functionality module 218 may determine a mode of operation to be performed by the individual device 110. For example, the functionality module 218 may determine the mode using illustrative predetermined corresponding relationships between multiple modes and distances that is listed below in Table 1, which may be implemented as a lookup table. In some embodiments, there may be a distance threshold for transitioning between modes. In these instances, the distance threshold may be different in one direction than in the other such as to provide hysteresis between state changes. For example, the hysteresis may avoid undesirable false transitions due to a noise associated with movement of the user 114, or when the user 114 happens to be standing at one of the distance thresholds. In some embodiments, each mode may be associated with multiple variants (e.g., "near" and "far" variants), which may entail a blending or easing of the visuals and/or functionality of one distance-based mode into another.

TABLE 1

| Distance | Mode |
|---|---|
| 0~40 inches | Mode 1 |
| 41~65 inches | Mode 2 |
| 66~120 inches | Mode 3 |
| 121~180 inches | Mode 4 |

After mode determination, the communication module 214 may transmit a command to instruct the individual device 110 to perform a function corresponding to the determined mode.

In some embodiments, the predetermined corresponding relationship may also include functions corresponding to the distances and the modes, which are listed in illustrative Table 2, and may be implemented as a lookup table. In some embodiments, the display module 220 may display the interface 108 corresponding to the function that is performed by the individual device 110. For example, the display module 220 may display a whiteboard when the user 114 is within a reachable distance from the display 104, and the individual device 110 functions as a color palette.

TABLE 2

| Distances | Modes | Functions of the Individual device 110 |
|---|---|---|
| 0~40 inches | Mode 1 | Color Palette |
| 41~65 inches | Mode 2 | Visual keyboard |
| 66~120 inches | Mode 3 | Speaker |
| 121~180 inches | Mode 4 | Recorder |

In some instances, the program modules 208 may also include a context module 222 configured to determine context such as a task that is operated on the shared device 102 and/or the individual device 110. In these instances, the functionality module 218 may determine the mode based on the distance and/or context. For example, the predetermined corresponding relationship between the distances and modes may be context-specific, which is listed below in illustrative Table 3, which may be implemented as a lookup table.

TABLE 3

| Distances & Task (Presentation) | Distances & Task (Painting) | Modes |
|---|---|---|
| 0~60 inches | 0~40 inches | Mode 1 |
| 61~120 inches | 41~65 inches | Mode 2 |
| 121~180 inches | 66~120 inches | Mode 3 |
| 181~240 inches | 121~180 inches | Mode 4 |

In some embodiments, the operating system 206 includes a component-based framework that supports components (including properties and events), objects, inheritance, polymorphism, reflection, and the operating system 206 may provide an object-oriented component-based application programming interface (API). Again, a terminal may have fewer components but will interact with a computing device that may have such a basic configuration.

The shared device 102 may have additional features or functionality. For example, the shared device 102 may also include additional data storage devices (removable and/or non-removable) such as, for example, magnetic disks, optical disks, or tape. Such additional storage is illustrated in FIG. 1 by removable storage 224 and non-removable storage 226.

Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. The system memory 204, the removable storage 224 and the non-removable storage 226 are all examples of computer storage media. Computer storage media includes RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that may be used to store the desired information and which may be accessed by the shared device 102. Any such computer storage media may be part of the shared device 102. Moreover, the computer-readable media may include computer-executable instructions that, when executed by the processor unit(s) 202, cause the shared device 102 to perform various functions and/or operations described herein.

In contrast, communication media may embody computer-readable instructions, data structures, program modules, or other data in a modulated data signal, such as a carrier wave, or other transmission mechanism. As defined herein, computer storage media does not include communication media.

The shared device 102 may also have input device(s) 228 such as keyboard, voice input device, touch input device (e.g., stylus, pen, etc.), touch screen device, navigation devices (e.g., track pad, mouse, etc.) etc. In some embodiments, input methods may be implemented via Natural User Interface (NUI). NUI may include any interface technology that enables a user to interact with a device in a "natural" manner, free from artificial constraints imposed by input devices such as mice, keyboards, remote controls, and the like. Examples of NUI methods may include those relying on speech recognition, touch and stylus recognition, gesture recognition both on screen and adjacent to the screen, air gestures, head and eye tracking, voice and speech, vision, touch, gestures, and machine intelligence. Categories of NUI technologies may include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods).

In some embodiments, the shared device 102 may include the sensing device 106 that receives and/or responses to an input signal generated via methods such as NUI. For example, the sensing device 106 may be a motion sensing input device that receives and/or responses to signals used for partial or full-body three dimension motion capture, facial recognition and voice recognition. In some instances, the sensing device 106 may track one or more users in various conditions (e.g., complete darkness) by tracking users' bodies (e.g., skeletons and appendage). The appendage may include arms, legs, and heads of the users.

The shared device 102 may also output device(s) 230 such as a display (e.g., the display 104), speakers, printer, etc. The shared device 102 may also contain communication connections 232 that allow the device to communicate with other computing devices (e.g., the individual device 110), such as over a network such as the networks 112.

Figure 3:
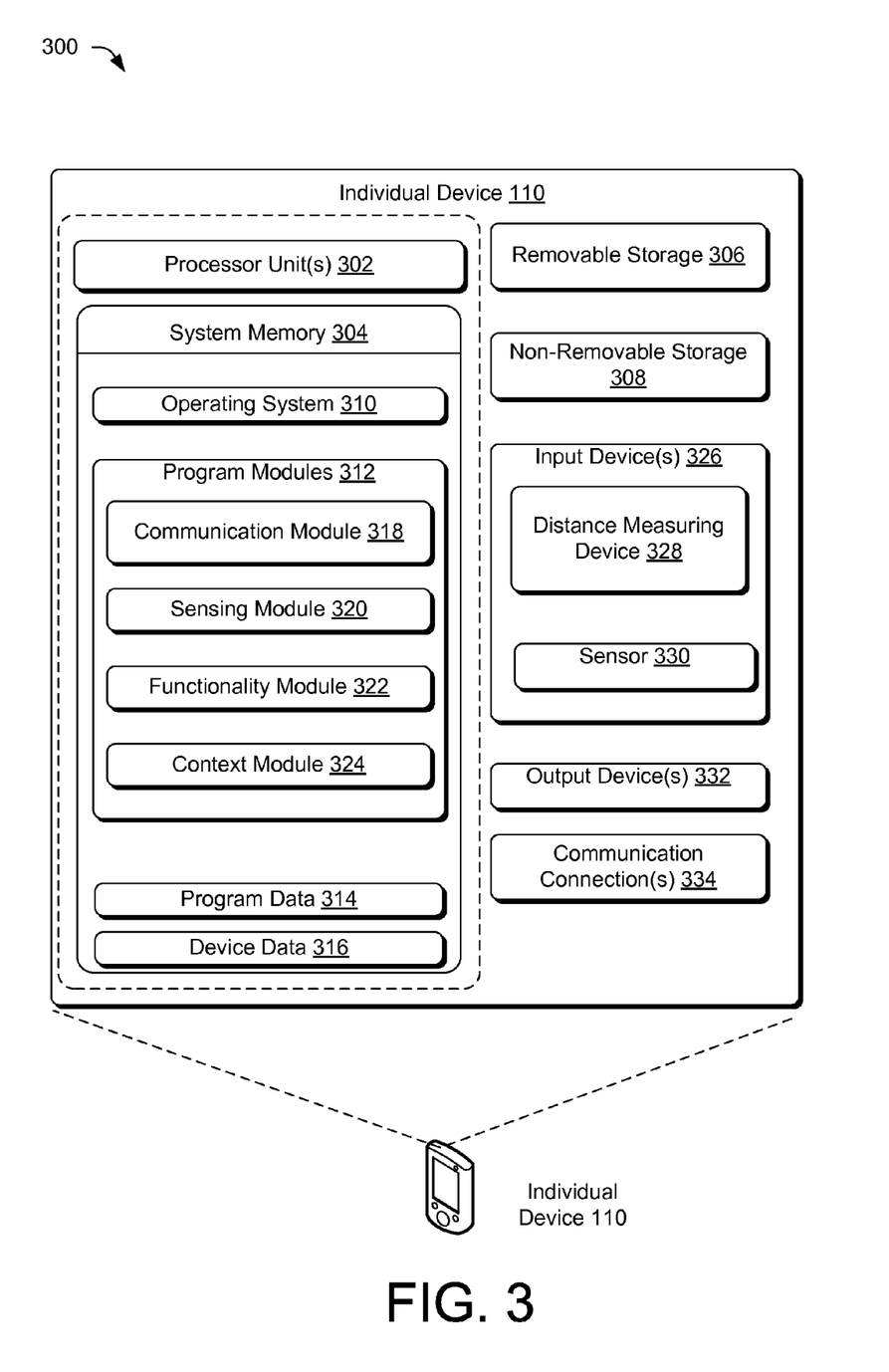
FIG. 3 illustrates an example architecture of the individual device shown in FIG. 1.

FIG. 3 illustrates an example architecture 300 of the individual device 110 shown in FIG. 1. In the illustrated embodiment, the individual device 110 may include at least one processing unit 302 and system memory 304. Depending on the exact configuration and type of computing device, the system memory 304 may be volatile (such as RAM), non-volatile (such as ROM, flash memory, etc.) or some combination of the two. The individual device 110 may also include additional data storage devices such as removable storage 306 and non-removable storage 308. The system memory 304, the removable storage 306 and the non-removable storage 308 are all examples of computer storage media.

The system memory 304 typically includes an operating system 310, one or more program modules 312, and may include program data 314 as well as device data 316. In some instances, the device data 316 may store information associated with devices (e.g., the shared device 102) that have connected and/or are to be connected with the individual device 110. The program modules 312 may include a communication module 318, a sensing module 320, a functionality module 322, and/or a context module 324, each discussed in turn.

The communication module 318 is configured to communicate with devices such as the shared device 102 and/or the server 128. In some embodiments, the communication module 318 may initialize and establish a connection with the shared device 102 via, for example, a Bluetooth connection, the network 112, or another connection protocol.

The sensing module 320 is configured to measure a distance between the display 104 and the individual device 110. In some embodiments, the sensing module 320 may detect the display 104, and measure the distance between the display 104 and the individual device 110 by using a distance measuring device or other input devices associated with the individual device 110, such as a camera. For example, when combined with imagery from a camera, the sensing module 320 may detect and/or recognize an reference feature of the display 104, such as a frame of the display 104 or other object/image located on or near the display, and then measure (or approximate) the distance between the individual device 110 and the display 104 based on changes in the size of the reference feature of the display 104 as sensed by the imagery from the camera or other data. The sensing module 320 may update the distance information at any different interval (periodic, after detected movement, random, etc.) in response to movement of the individual device 110.

Based on the distance information, the functionality module 322 may determine a mode associated with the individual device 110. For example, the functionality module 322 may determine the mode using predetermined corresponding relationship between multiple modes and distances. In some embodiments, the program modules 208 may include the context module 324 configured to determine context such as a task that is operated on the shared device 102 and/or the individual device 110. In these instances, the functionality module 322 may determine the mode based on the distance and/or context.

The individual device 110 may also have input device(s) 326 such as a touch screen device, physical buttons (menu buttons, keyboard, etc.), touch input devices (stylus, pen, etc.), a voice input device, a camera, a light sensor, a microphone, etc. In some embodiments, input methods may be implemented via NUI. In some embodiments, the input devices 326 may include a distance measuring device 328 capable of measuring the distance between the display 104 and the individual device. For example, the distance measuring device may be a camera associated with the individual device 110. In some instances, the input devices 326 may also include a sensor 330 capable of detecting movement of the individual device 110, such as a Global Positioning System (GPS) device, a motion detector, depth-sensing cameras, triangulation via signal strengths, infrared range detection, and etc.

In some embodiments, the individual device 110 includes output device(s) 332 such as a display, speakers, etc. The individual device 110 may also contain communication connections 334 that allow the device to communicate with other computing devices (e.g., the shared device 102), such as over a network such as the networks 112.

Illustrative Operations

Figure 4:
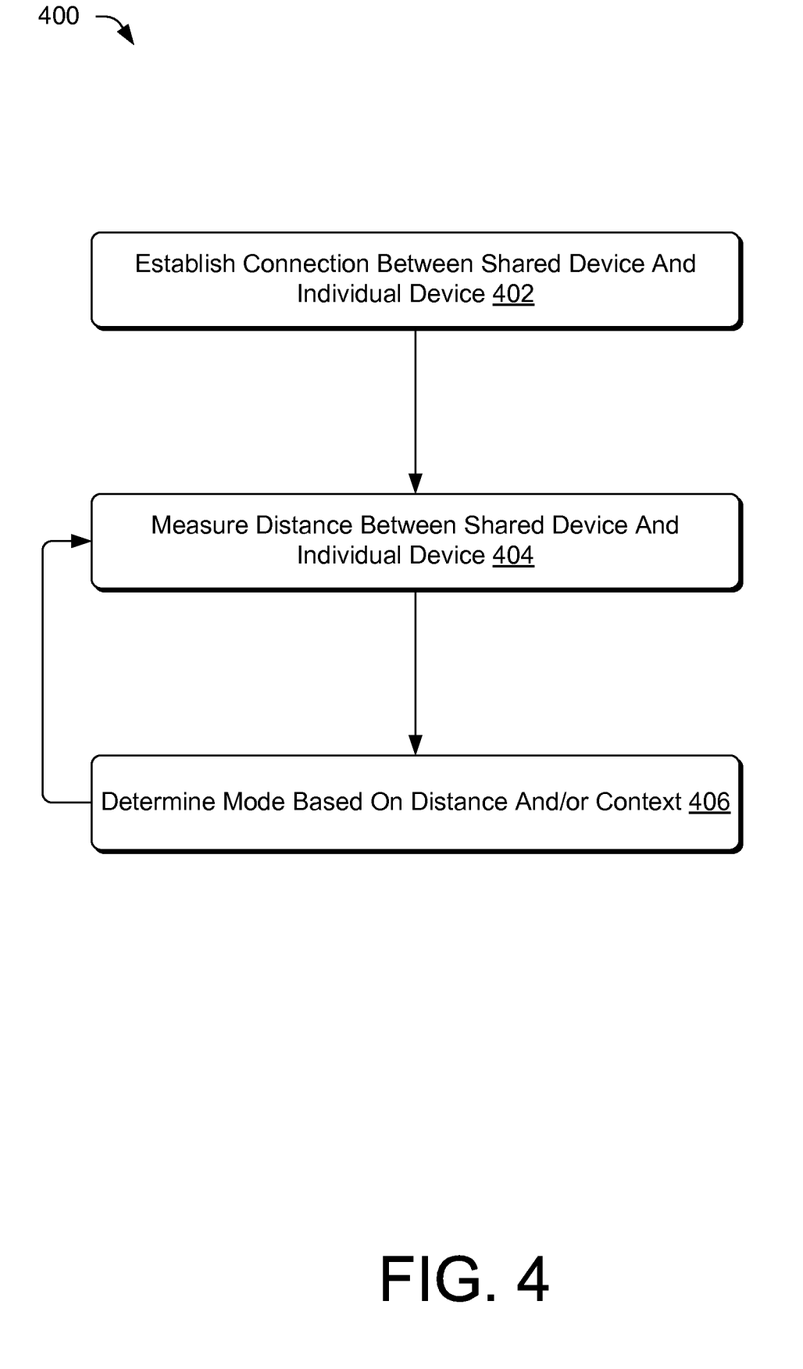
FIG. 4 illustrates an example process to modify a functionality based on distances between devices.

FIG. 4 illustrates an example process 400 to modify a functionality based on distances between devices. The process 400 and other processes described throughout this disclosure, including the processes 500 and 600, are illustrated as collections of blocks in logical flow graphs, which represent sequences of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process.

At 402, the shared device 102 and the individual device 110 may establish a connection to enable communication between the shared device 102 and the individual device 110. For example, the shared device may establish a connection with the individual device by performing a connection protocol, such as a handshake or pairing of information, exchange of credentials, etc. The connection may be initiated by either device. In some embodiments, the devices may initiate the connection when the devices are within a predetermined distance from one another, touching each other, etc.

At 404, a distance between the shared device 102 and the user 114 and/or the individual device 110 may be measured. The distance may be measured by the shared device 102, the individual device 110, or both. For example, the shared device 102 may use the sensing device 106 to determine a distance of the user 114 or the individual device 110 with respect to the sensing device 106, the display 104, or another location. The individual device 110 may determine the distance based on information from the distance measuring device 328, which may measure or approximate the distance between the individual device 110 and the display 102 based on a size of a reference feature, as discussed above.

At 406, based on the measured distance from the operation 404, a mode to be implemented by the individual device 110 may be determined. The mode may be determined using predetermined corresponding relationships between multiple distances and modes, such as those shown in the illustrative Table 1. In some embodiments, the mode may be determined based on the distance and/or context, such as a task that the individual device 110 and/or the shared device 102 are operating.

The operations 404 and 406 may be performed in a loop, which may continually update the distance measurement and corresponding mode, as necessary. In some instances, the distance may be updated at predetermined intervals, random intervals, in response to trigger events, and so forth. For example, the distance may be updated in response to movement of the user 114 and/or the individual device 110. The shared device 102 may detect movement of the user 114, and then update the distance information after measuring the distance between the user 114 and the display 104 via the operation 404. Based on the updated distance, the shared device 102 may update the mode via the operation 406, and then transmit a command to instruct the individual device to perform a new function corresponding to the update mode.

Figure 5:
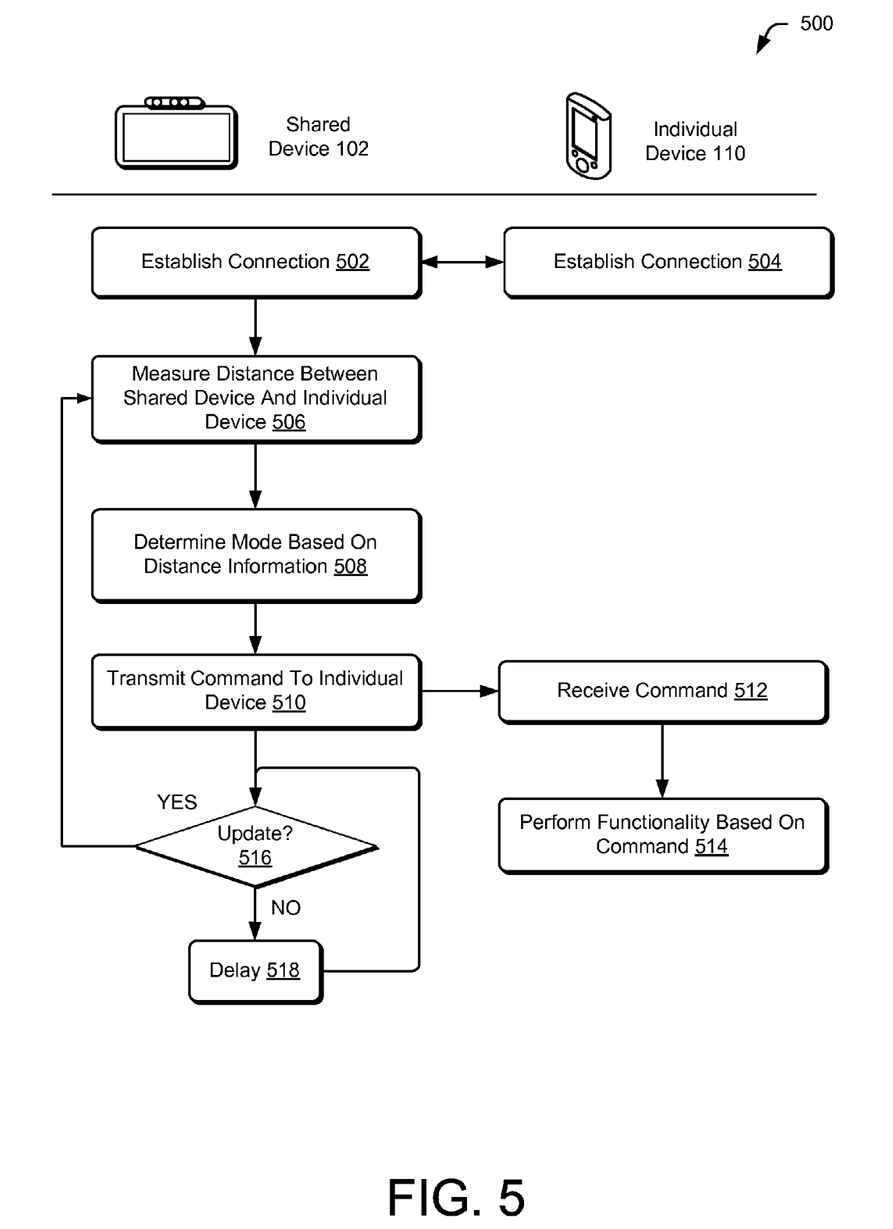
FIG. 5 illustrates an example process to modify a functionality based on distances between devices, wherein the shared device measures the distances.

FIG. 5 illustrates an example process 500 to modify a functionality based on distances between the shared device 102 and the individual device 110, wherein the shared device 102 measures the distance between the shared device and the user 114 (or the individual device 110 held by the user).

At 502 and 504, the shared device 102 and the individual device 110 may establish a connection to enable communication between the shared device 102 and the individual device 110. For example, the shared device 102 may establish a connection with the individual device by performing a connection protocol, such as a handshake or pairing of information, exchange of credentials, etc. The connection may be initiated by either device. In some embodiments, the devices may initiate the connection when the devices are within a predetermined distance from one another, touching each other, etc.

At 506, the shared device 102 may measure a distance between the shared device 102 and the user 114 or the individual device 110. For example, the shared device 102 may use the sensing device 106 to determine a distance of the user 114 or the individual device 110 with respect to the sensing device 106, the display 104, or another location.

At 508, the shared device 102 may determine a mode based on the distance determined at the operation 506. For example, the operation 508 may determine the mode based on a lookup table such as the illustrative Table 1. In some embodiments, the mode may be based on a context of operation of the shared device. In such instances, the context may be used along with the distance information to determine the mode at the operation 508.

At 510, the shared device 102 may transmit a command to provide mode information to the individual device 110. The individual device 110 may receive the command at 512, and then perform a function corresponding to the mode information at 514. In some embodiment, the individual device 110 may modify functionality by perform a function corresponding to the updated mode information.

At 516, following the operation 510, the shared device 102 may determine whether to update the information, such as the distance information and/or the mode information such as by initiating a loop process. When the shared device 102 determines to perform an update (following the "yes" route from the decision operation 516), then the process 500 may advance to the operation 506. However, when the shared device 102 determines not perform an update (following the "no" route from the decision operation 516), then the process 500 may enter a delay at 518 and then return to the decision operation 516. The updated determination may be based on an amount of elapsed time, an amount of movement of the user 114 and/or the individual device 110, and/or other triggering events.

Figure 6:
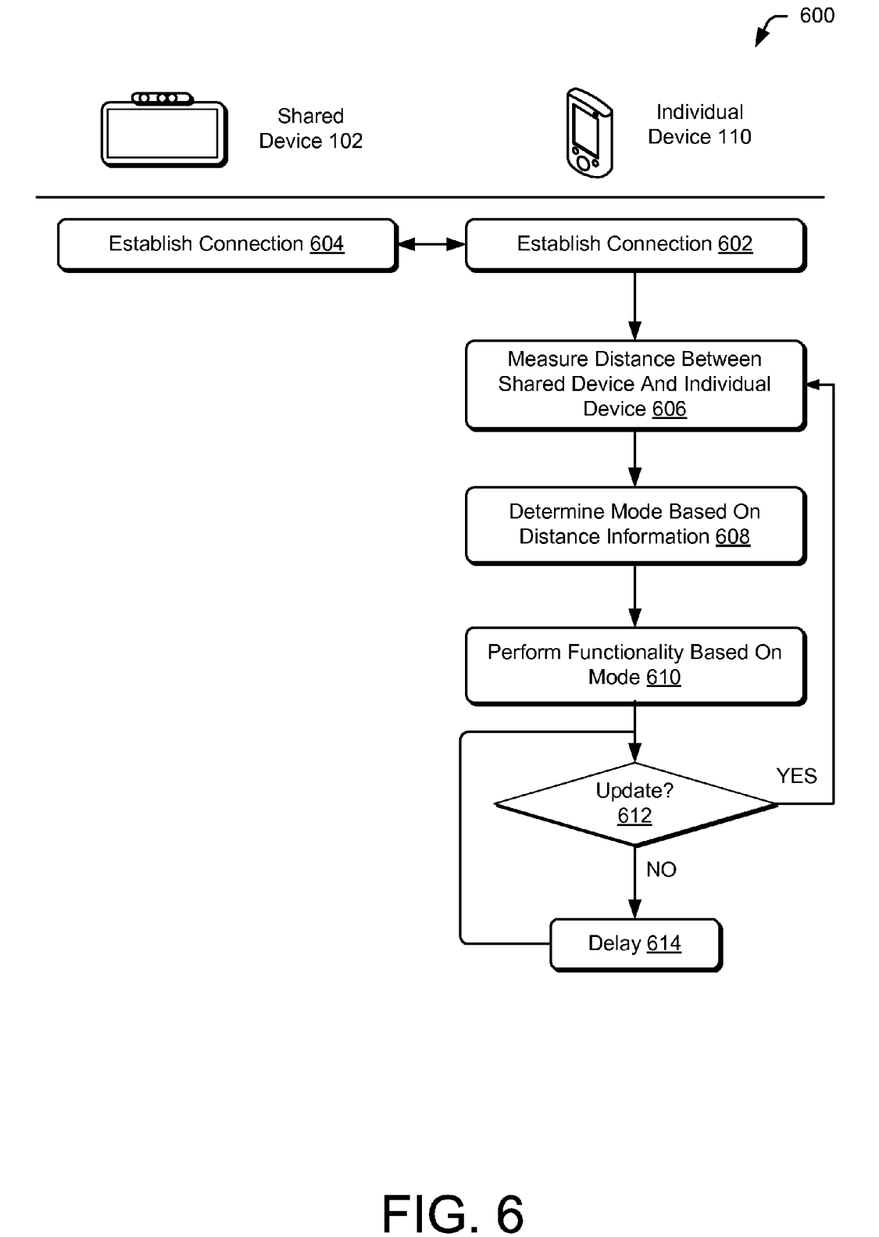
FIG. 6 illustrates an example process to modify a functionality based on distances between devices, where the individual device measures the distances.

FIG. 6 illustrates an example process 600 to modify a functionality based on distances between the shared device 102 and the individual device 110, wherein the individual device 110 measures the distance between the shared device and the user 114 (or the individual device 110 held by the user).

At 502 and 504, the shared device 102 and the individual device 110 may establish a connection to enable communication between the shared device 102 and the individual device 110. For example, the shared device 102 may establish a connection with the individual device by performing a connection protocol, such as a handshake or pairing of information, exchange of credentials, etc. The connection may be initiated by either device. In some embodiments, the devices may initiate the connection when the devices are within a predetermined distance from one another, touching each other, etc.

At 606, the individual device 110 may measure a distance between the shared device 102 and the individual device 110. For example, the individual device 110 may use the sensor 330 to determine a distance of the individual device 110 with respect to the sensing device 106, the display 104, or another location.

At 608, the individual device 110 may determine a mode based on the distance determined at the operation 606. For example, the operation 608 may determine the mode based on a lookup table such as the illustrative Table 1. In some embodiments, the mode may be based on a context of operation of the individual device 110 and/or the shared device 102. In such instances, the context may be used along with the distance information to determine the mode at the operation 608.

At 610, the individual device 110 may perform a function corresponding to the mode information at 608. In some embodiment, the individual device 110 may modify functionality by perform a function corresponding to the updated mode information.

At 612, following the operation 610, the individual device 110 may determine whether to update the information, such as the distance information and/or the mode information such as by initiating a loop process. When the individual device 110 determines to perform an update (following the "yes" route from the decision operation 612), then the process 600 may advance to the operation 606. However, when the individual device 110 determines not perform an update (following the "no" route from the decision operation 612), then the process 600 may enter a delay at 614 and then return to the decision operation 612. The updated determination may be based on an amount of elapsed time, an amount of movement of the user 114 and/or the individual device 110, and/or other triggering events.

Figure 7:
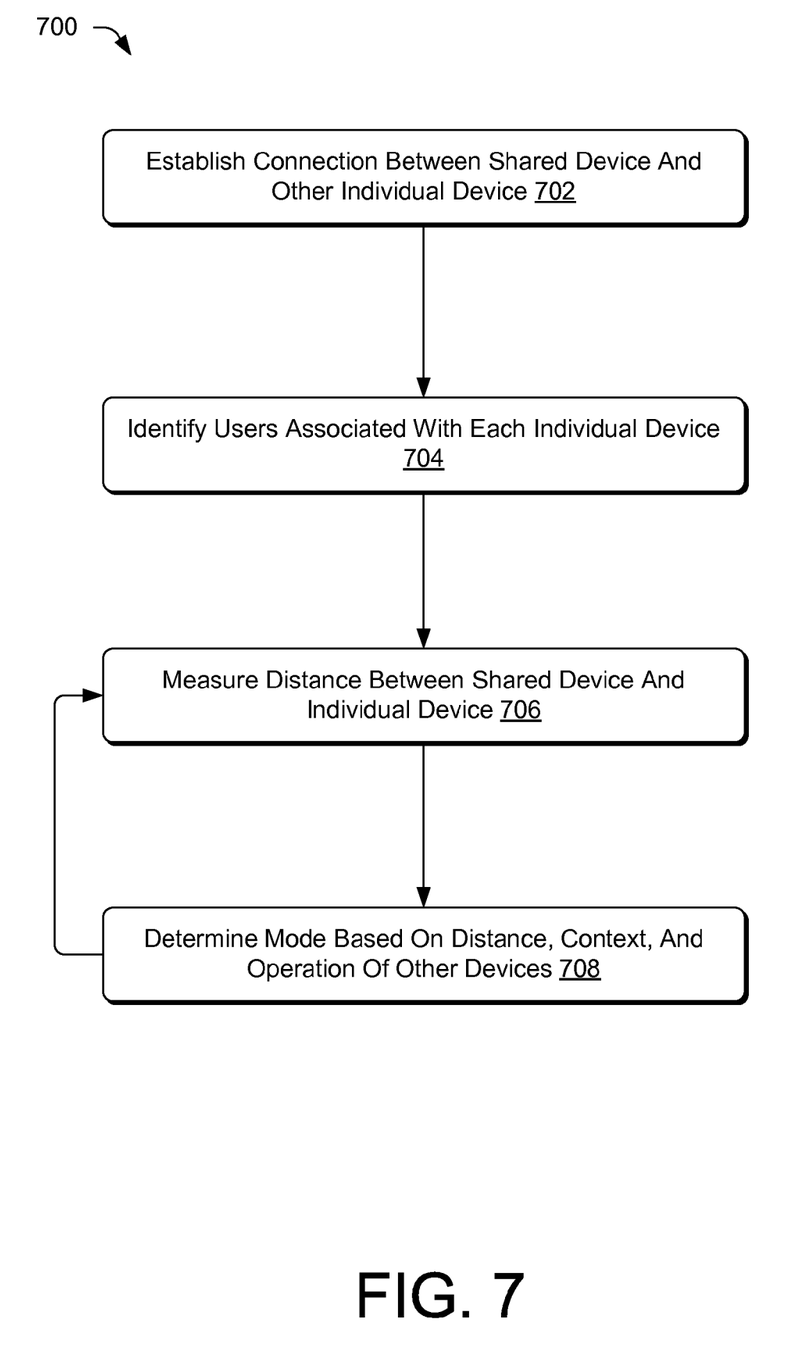
FIG. 7 illustrates an example process to modify a functionality based on distances between multiple devices.

FIG. 7 illustrates an example process 700 to modify a functionality based on distances between multiple devices.

At 702, the shared device 102 and the individual device 110 may establish a connection to enable communication between the shared device 102 and the individual device 110. The operation 702 may be performed in a same or similar way as the operation 402.

At 704, the shared device 102 may identify or determine users associated with each individual device. For example, the shared device 102 may register a user via a registration process. The registration process may occur before, during, or after the operation 702. In an example, the registration may occur after the operation 702, where the shared device 102 identifies a user associated with a shared device based on an appearance of the user, a device associated with the user (e.g., a radio frequency identifier, a stylus with an identifier, etc.). The shared device 102 may then create an association between the individual device (connected at the operation 702) and the user determined from the operation 704.

At 706, the shared device may measure a distance between the shared device 102 and a particular user and/or a particular individual device. The operation 706 may be performed in a same or similar way as the operation 404.

At 708, a mode to be selected by the shared device based on one or more of the distance from the operation 706, the particular user identified at the operation 704, and/or a context of operation of the shared device 102. For example, the shared device 102 may provide each user and associated individual device with different controls, and thus may determine the mode based on information about operation of the other individual devices when determining a mode of operation for a particular individual device associated with a particular user.

The operations 706 and 708 may be performed in a loop, which may continually update the distance measurement and corresponding mode, as necessary. In some instances, the distance may be updated at predetermined intervals, random intervals, in response to trigger events, and so forth. For example, the distance may be updated in response to movement of the users and/or the individual devices.

Conclusion

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

What is claimed is:

1. A method comprising:
    establishing, by a shared device, a connection with a computing device;
    measuring a distance between the shared device and the computing device or a user operating the computing device;
    selecting an operational mode based on the distance; and
    instructing the computing device to perform a set of functions corresponding to the operational mode.

2. The method of claim 1, further comprising:
    detecting movement of the computing device or the user operating the computing device; and
    updating the distance and the operational mode in response to the movement.

3. The method of claim 1, wherein instructing the computing device to perform the set of functions corresponding to the operational mode comprises:
    generating or updating a user interface associated with the shared device based on the operational mode; and
    extending the user interface to the computing device.

4. The method of claim 1, wherein measuring the distance between the shared device and the computing device or the user operating the computing device is performed by one or more cameras associated with the shared device.

5. The method of claim 1, wherein selecting the operational mode based on the distance further comprises determining an orientation of the user in relation to a display associated with the shared device.

6. The method of claim 1, further comprising:
    recording input that is received from the computing device; and
    associating the recorded input with the computing device or the user operating the computing device.

7. The method of claim 1, further comprising:
    establishing an additional connection with an additional computing device; and
    measuring an additional distance between the shared device and the additional computing device or an additional user operating the additional computing device.

8. The method of claim 7, wherein the additional user and the user are tracked using a motion sensor associated with the shared device.

9. The method of claim 7, wherein the additional user and the user are tracked based on at least one of:
- gesture recognition;
- face recognition; or
- voice recognition.

10. The method of claim 1, further comprising:
- determining a context of a task performed on the shared device; and
- selecting the operational mode based on the distance and the context.

11. The method of claim 1, further comprising:
- detecting an object within a certain proximity from a display associated with the shared device;
- determining a change in a size of the object; and
- measuring the distance between the shared device and the computing device based at least partly on the change in the size of the object.

12. The method of claim 11, further comprising updating the distance between the shared device and the computing device, the distance being updated at periodic intervals, at random intervals, or after a movement of the computing device.

13. One or more computer storage media storing computer-executable instructions that, when executed on one or more processors, causes the one or more processors to perform acts comprising:
- establishing a connection with a shared device;
- measuring a distance between the shared device and a computing device;
- selecting an operational mode associated with a user interface based on the distance or an orientation of a user in relation to a display associated with the shared device; and
- performing a set of functions corresponding to the operational mode.

14. The one or more computer storage media of claim 13, wherein the acts further comprise:
- detecting movement of the computing device or a change of the orientation of the user in relation to the display; and
- updating the distance in response to the movement of the computing device or the change of the orientation of the user in relation to the display.

15. The one or more computer storage media of claim 13, wherein the operational mode is further determined based on a context of a task performed on the shared device.

16. A computing device, comprising:
- one or more processors; and
- memory to maintain one or more components executable by the one or more processors to:
  - exchange data with a mobile device;
  - measure a distance between the computing device and the mobile device;
  - select an operational mode based on the distance; and
  - transmit a set of functions to be performed by the mobile device corresponding to the operational mode.

17. The computing device of claim 16, wherein the one or more components are further executable by one or more processors to:
- detect movement of a user operating the mobile device; and
- update the distance and the operational mode in response to the movement.

18. The computing device of claim 16, wherein the one or more components are further executable by the one or more processors to: select the operational mode based on the distance between the computing device and the mobile device and a context of a task performed on the shared device.

19. The computing device of claim 16, wherein the one or more components are further executable by one or more processors to:
- connect with an additional computing device; and
- measure an additional distance between an additional user operating the additional computing device and the shared device.

20. The computing device of claim 19, wherein the additional user and the user are tracked based on at least one of:
- gesture recognition;
- face recognition; or
- voice recognition.

* * * * *